United States Patent [19]
Jones

[11] 3,883,012
[45] May 13, 1975

[54] DRY CASK HANDLING SYSTEM FOR SHIPPING NUCLEAR FUEL
[75] Inventor: Cecil R. Jones, Orange, Conn.
[73] Assignee: Transfer Systems Incorporated, North Haven, Conn.
[22] Filed: Oct. 9, 1973
[21] Appl. No.: 404,434

Related U.S. Application Data
[63] Continuation-in-part of Ser. No. 191,247, Oct. 21, 1971, Pat. No. 3,765,549.

[52] U.S. Cl.................. 214/17 B; 176/30; 214/18 N
[51] Int. Cl............................................. B66c 17/00
[58] Field of Search.................. 214/17 B, 18 N, 41; 176/30

[56] References Cited
UNITED STATES PATENTS
3,190,805  6/1965  Straub et al. .......................... 176/30
3,282,793  11/1966  Jamrog.......................... 214/17 B X FOREIGN PATENTS OR APPLICATIONS
938,311  10/1963  United Kingdom............... 214/17 B Primary Examiner—Robert G. Sheridan

[57] ABSTRACT

A nuclear facility is described for improved handling of a shipping cask for nuclear fuel. After being brought into the building, the cask is lowered into a tank mounted on a transporter, which then carries the tank into a position under an auxiliary well to which it is sealed. Fuel can then be loaded into or unloaded from the cask via the auxiliary well which is flooded. Throughout the procedure, the cask surface remains dry.

9 Claims, 3 Drawing Figures

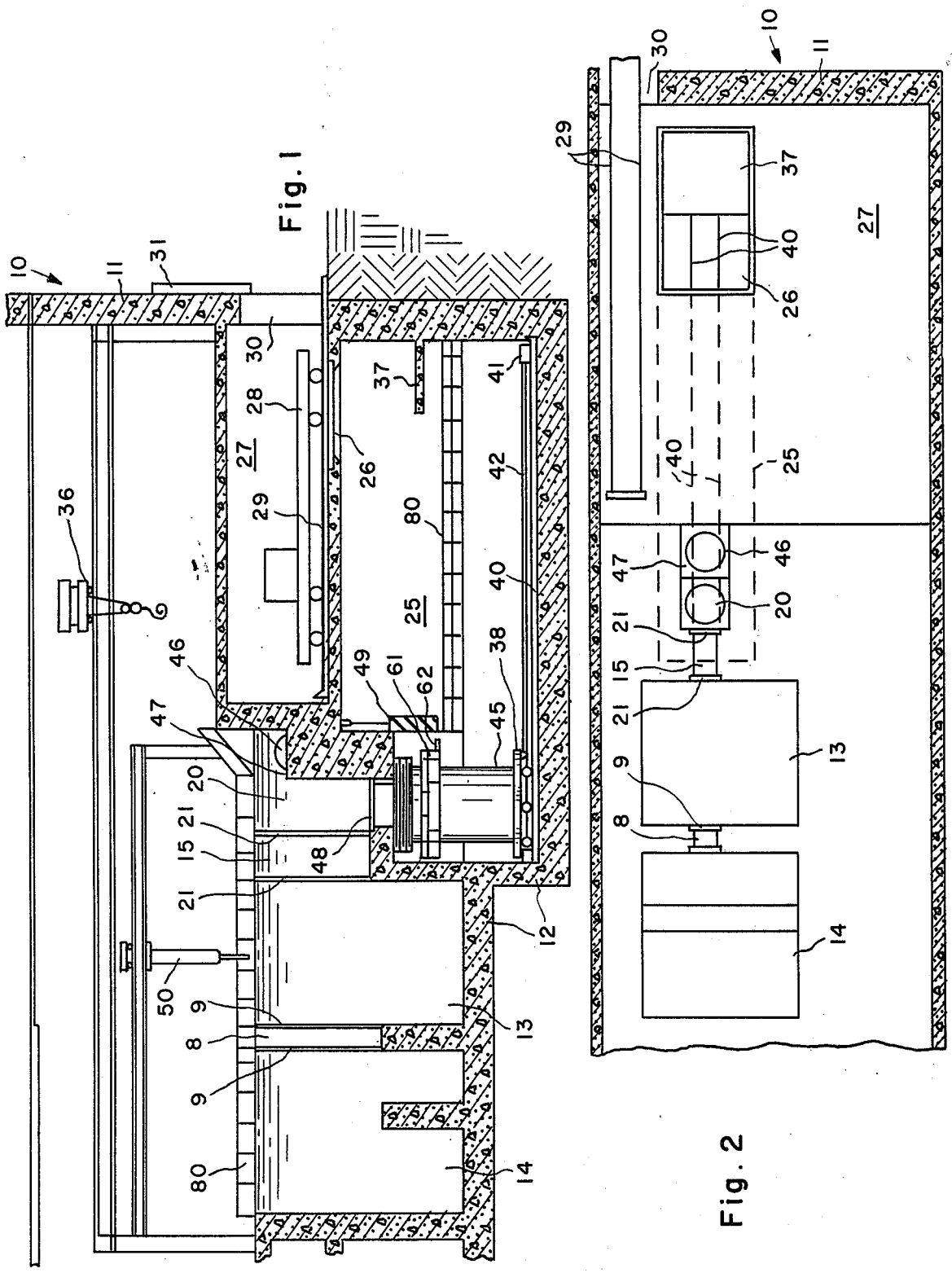

DRY CASK HANDLING SYSTEM FOR SHIPPING NUCLEAR FUEL

The present application is a continuation-in-part of my earlier copending application, Ser. No. 191,247, filed Oct. 21, 1971, now U.S. Pat. No. 3,765,549, granted Oct. 16, 1973.

This invention relates to a power nuclear reactor facility or station adapted to simplify refueling.

My said earlier application, whose contents are hereby incorporated by reference, describes a nuclear reactor power station comprising at an upper level a place for using or storing nuclear fuel, and at a lower level a location to which apparatus for transporting nuclear fuel has access. For instance, the lower level may be ground level, and the fuel transport means is a shielded cask brought into the lower level by a railway car. In order to alleviate the difficulties and hazards entailed in the prior art facilities, which required lifting of the cask from the lower level up to the higher level and then its placement into the fuel storage location, usually for a light water reactor a fuel storage pool, the said earlier application described the provision of an auxiliary well connecting the upper and lower levels, and means for flooding the auxiliary well after coupling the cask to the well bottom to enable the fuel to be passed from the upper level, via the flooded auxiliary well, into the cask without moving the cask to the higher level and while maintaining the cask exterior dry and thus free of radioactive contamination by the storage pool water.

While the facility described in my earlier copending application is a significant improvement over prior art construction, there are certain applications wherein the specific embodiments disclosed in the prior application may not readily be applicable.

The present application describes an improved facility which achieves the main advantages of my earlier invention, and in addition offers certain features and advantages which are not present in my earlier invention. These features and advantages will be best understood from the following detailed description of an exemplary embodiment of my present invention taken in conjunction with the accompanying drawings, wherein:

FIg. 1 is a partial cross-sectional view of one form of nuclear station embodying the present invention showing the locations of the fuel pool and cask-handling areas;

FIG. 2 is a plan view from the top of the facility shown in FIG. 1 to show the horizontal arrangement of the areas;

Figure 3:
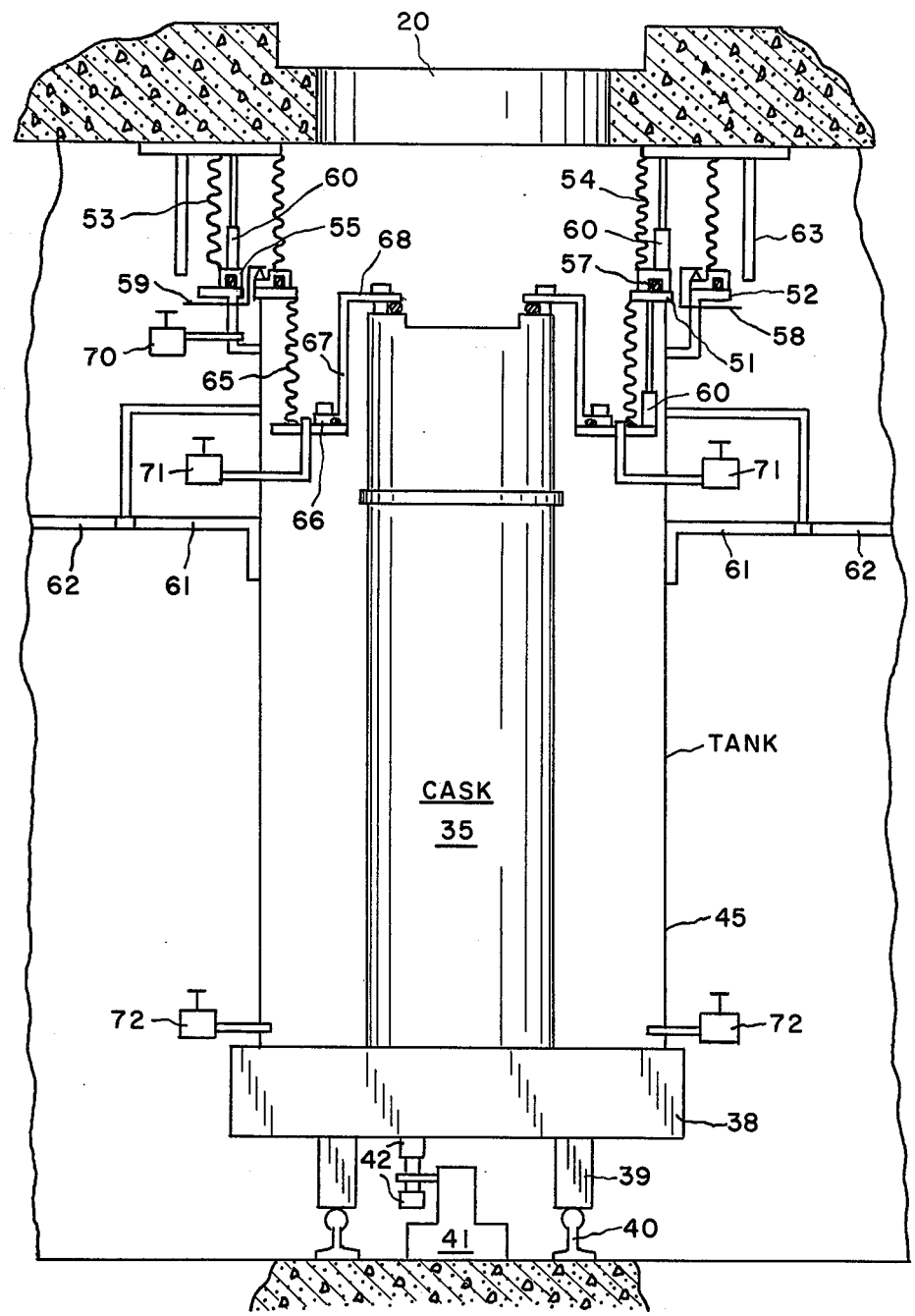
FIG. 3 is a cross-sectional detail view showing how the cask fits within the tank and how the latter may be sealed to the auxiliary well opening.

Similar to what was described in my earlier copending application, the principles of the present invention are applicable not only to a power generating station or facility, but also to an installation for handling or reprocessing fuel for nuclear reactors. The present embodiment will be described in connection with a nuclear reactor station or building, referring now to FIGS. 1 and 2, which comprises a building 10 inset in the ground and having shielding exterior walls 11, for example of concrete, and a lower floor 12. The building is divided into a number of wells and areas by interior walls which may also be of concrete. One such well 13 is located in an upper part of the building and contains a pool of water for shielding purposes. In a reactor installation of the conventional light water variety, this would be the fuel storage or spent fuel pool where new fuel is stored for use as replacements for spent fuel in a nuclear reactor, and where the spent fuel is stored prior to loading in a cask for transport to a fuel reprocessing plant. An adjacent well 14 would be present for the reactor itself. That well would be connected by a suitable canal 8 closed off by movable doors 9 to the spent fuel pool 13 to permit transfer of fuel assemblies between the two without removal from the shielding and cooling water present therein.

In a reprocessing plant, the well 13 could represent the pool wherein the spent fuel elements are disassembled and new fuel elements constructed.

The spent fuel pool 13 is connected by way of a transfer canal 15 in a side wall to a cylindrical auxiliary well or canal 20, which becomes the fuel transfer pool when filled with water. Suitable doors 21 are provided for closing off the transfer canal 15 in a water-tight manner. The doors may be remotely activated to open up or close off the transfer canal by means well known in the art.

The fuel transfer pool 20 extends from the level of the spent fuel pool 13 vertically down through the building where its bottom, which is open, terminates in a cask receiving area 25 which extends under the auxiliary well. Access to the cask receiving area is via a hatch 26 in the ceiling to an area 27 preferably at ground level which thus can accommodate a cask transport vehicle, such as a railroad car 28. The railroad car 28 rides on rails 29 which run along the floor of the vehicle receiving area 27 and through a door opening 30 in the exterior building wall 11 to the outside. The door opening 28 may be closed off by shielding doors 31 providing a reasonably sealed receiving area 27 in case of an accident occurring during loading or unloading of the fuel. The transport vehicle 28 has provision for holding a shipping cask for nuclear fuel secured to it (not shown in FIGS. 1 and 2). The shipping cask (35 in FIG. 3) as is known comprises an elongated hollow cylinder of lead or other radiation shielding material.

In a normal cask-handling procedure, the railway car 28 carrying the cask is brought into its receiving area 27. After the outer door 31 is closed, the usual overhead crane 36 lifts the cask off the car and moves it laterally until it is over the hatch 26, whose cover (not shown) had been previously removed, and then the cask is lowered through the hatch onto a shelf 37 provided at an intermediate position within the cask receiving area 25. As will be observed, the shelf 37 is located some distance laterally from the fuel transfer pool 20. For moving the cask between those two locations, a cask transporter is provided in the form of a flat bed cart 38 having wheels 39 riding on rails 40. Means are provided for moving the transporter 38 between the shelf at one end and the fuel transfer pool 20 at the other. For this purpose it is preferred to use as the drive unit an electric motor with suitable gear reducer 41 for driving under positive control in opposite directions an endless chain drive 42 connected to the cart. Suitable brakes are provided for locking the cart 38 in any position desired.

The cask is not secured directly to the top of the flat bed cart. To the cart top is bolted a tank 45 capable of retaining the spent transfer pool water. Instead of the cask being sealed to the auxiliary well bottom, the tank is sealed to the well bottom. This offers the advantage that the system is capable of accommodating fuel casks of varying dimensions, provided of course they fit within the tank. The cask exterior is nevertheless maintained dry by providing a seal assembly between the cask opening and the tank walls.

To continue with the procedure, after the cask has been located on the shelf, its crushable cover is removed, and then the cask lid 46 is removed and transported to a storage position 47 adjacent to the fuel transfer pool. Next the cask is lifted from the shelf and placed in the tank 45 on the transporter 38, which had previously been moved into position under the hatch 26. The tank to cask seal or adaptor is installed, and the transporter drive 41 is then actuated to move the tank on the cart 38 under the fuel transfer pool 20. The transporter is locked and suitable seismic restraints installed, and then the tank top is sealed to the well bottom using a double bellows system similar to that described in the said copending application. Then the fuel transfer pool 20 is flooded, the seal door 48 at the bottom of the well opened, and after inspection of the seals to ensure no leakage is present, the fuel slot doors 21 may be opened, a radiation shielding block 49 lowered into position as shown to wall off the area around the seals not protected by the concrete walls, and fuel then transferred by the fuel hoist 50 from the spent fuel pool 13 through the fuel transfer canal 15 and via the fuel transfer pool 20 and loaded into the cask 35, or vice versa. Reference numerals 80 designate protective railings provided for personnel who oversee the cask loading or unloading procedure.

FIG. 3 is a detail view showing the various seals provided to ensure a proper leakage barrier against the contaminated pool water and also maintain the outer cask walls dry. The tank is provided at its upper end with a double flange assembly comprising an outer flange 52 and an inner flange 51, both with upper sealing surfaces. The tank 45, which may be fabricated of steel, preferably is of a double wall construction, each wall of which is fully capable of withstanding the water pressure to which the tank is subjected. A double bellows system is provided to seal the tank top to the underside of the auxiliary well 20. As shown in FIG. 3, each of concentric outer 53 and inner 54 cylindrical bellows are permanently attached and sealed to the concrete section surrounding the pool 20 opening at its bottom. Each bellows is provided with a bottom section 55, 56, respectively containing a suitable O-ring seal 57 by which the bellows can be sealed to the tank flanges; the outer bellows 53 seals to the outer flange 52, and the inner bellows 54 seals to the inner flange 51. Suitable latches, for example, a series of annularly arranged quick attachment and release dogs, are provided to lock the individual bellows to the associated tank flange. One of the dogs for the outer bellows is shown schematically at 58, and one of the dogs for the inner bellows is shown schematically at 59. Pneumatic cylinders shown at 60 are provided to extend the bellows 53, 54 to seal to the tank flanges where they can be clamped by the dogs. A circular railed catwalk 61 is mounted on the tank at a suitable elevation to support personnel for manual operation of the seal latches and for inspection of the seals. The catwalk is also conveniently employed to provide attachment points for seismic restraint bars 62 for tying the tank to the surrounding building walls. Suitable sleeves and liners, one of which is shown at 63, may be provided to protect the bellows.

The cask-tank adaptor seal also comprises a cylindrical bellows member 65. The upper end of the adaptor bellows 65 is permanently attached to the inner flange 51 of the tank. The lower end of the adaptor bellows 65 is provided with an annular plate to which is bolted the lower flange 66 of an annular cask adaptor plate 67, whose upper flange 68 is in turn bolted to the top seal surface of the cask to which its lid is sealed. Suitable O-rings are used to achieve sealing at each interface. The adaptor bellows need have relatively few convolutions since it is only required to handle the difference in height between casks of the same type. The adaptor plate is dimensioned to accommodate the major changes in dimensions resulting from casks of different designs.

The tank 45 is provided with suitable drain lines and valving so that each internal cavity can be drained of water if present. A first drain shown at 70 serves to drain water which may leak into the cavity between the inner and outer bellows 53, 54. A second drain shown at 71 serves the cavity which includes the fuel transfer pool flooded during fuel transfer. A third drain shown at 72 is used to drain water which may leak past the adapter seal.

Both the system of the present invention and that of the earlier copending application offer the features that the cask exterior remains dry during the entire fuel transfer operation, eliminating the need for any decontamination procedures. Moreover, redundant leakage barriers are provided as a safety feature. In the present invention, in contrast to the earlier application, the leakage barrier includes the use of a double-wall tank 45 and two independent concentric bellows 53, 54. The adapter seal assembly which keeps the cask dry is totally contained within the double bellows system. Failure of the adapter seal only results in contamination of the outside surface of the cask. Failure of the double bellows will not result in uncontrolled release of contaminated water, since it can be confined within the closed cask receiving area 25.

While the present system requires cask transfer from the railroad car to the internal cask transporter, it will be observed that the total lift can be kept short, and most casks are designed to remain in a safe condition after a short fall. Moreover, if a drop occurs, it does so within the controlled cask receiving area 25 which involves little hazard of release of radioactivity to the environment. In addition, the present system allows the ground level elevation, the floor of the receiving area 27, to be located above the reactor well bottom and above the bottom of the auxiliary well. As a further advantage, casks of varying dimensions can be accommodated by the system.

While my invention has been described in connection with specific embodiments thereof, those skilled in the art will recognize that various modifications are possible within the principles enunciated herein and thus the present invention is not to be limited to the specific embodiments disclosed.

What is claimed is:

1. In a facility for handling radioactive nuclear fuel elements and comprising a structure having at a first location a fluid pool for receiving the fuel and at a second location a dry area for receiving a shielded shipping cask for transport of the fuel, and connecting the first and second locations a fuel transfer canal and means for flooding the fuel transfer canal whereby the fuel can be transferred between the locations via the flooded fuel transfer canal while maintaining the cask exterior dry, the improvement comprising a tank sized to receive the cask means for fluid-sealing the cask when within the tank to the tank in such manner that the cask exterior is isolated from the fuel transfer canal, and means for fluid-sealing the tank to the fuel transfer canal when the tank is provided adjacent thereto within the second location.

2. The facility of claim 1 and further comprising a third area wherein the cask is brought into the facility, said third area being located above the dry cask receiving area, and means for transferring the cask from the third area to the receiving area.

3. The facility of claim 2 wherein the dry cask receiving area is elongated with the fuel transfer canal at one end and an opening at the other end whereby the cask can be transferred therein from the third area, and means being provided for transporting the cask along the length of the receiving area.

4. The facility of claim 3 wherein the transport means includes means for supporting the tank.

5. The facility of claim 4 wherein the transporting means comprises a wheeled cart on rails and an endless motor driven chain attached to the cart.

6. The facility of claim 1 wherein the tank is double walled with plural flanged areas and a double bellows system is provided for fluid sealing the tank at the plural flanged areas to the underside of the fuel transfer canal.

7. The facility of claim 1 wherein the tank to cask fluid sealing means comprises an adapter member, means for sealing the adapter to the cask, a bellows sealed to the tank wall, and means for sealing the adapter to the bellows.

8. The facility of claim 6 and comprising drain means for the space between the bellows.

9. The facility of claim 7 and comprising drain means located on the adapter for the fuel transfer canal, and drain means for the space under the adapter between the cask and the tank.

* * * * *